(12) United States Patent
Rotsaert (10) Patent No.: US 9,536,262 B2
(45) Date of Patent: Jan. 3, 2017

(54) METHOD FOR VERIFYING AUTHENTICITY, CORRESPONDING SERVER, SYSTEM AND COMPUTER PROGRAM

(71) Applicant: COMPAGNIE INDUSTRIELLE ET FINANCIERE D'INGENIERIE "INGENICO", Paris (FR)

(72) Inventor: Christopher Rotsaert, Wasquehal (FR)

(73) Assignee: INGENICO GROUP, Paris (FR)

(*) Notice: Subject to any disclaimer, the term of this patent is extended or adjusted under 35 U.S.C. 154(b) by 679 days.

(21) Appl. No.: 13/961,234

(22) Filed: Aug. 7, 2013

(65) Prior Publication Data

US 2014/0046817 A1  Feb. 13, 2014

(30) Foreign Application Priority Data

Aug. 9, 2012  (FR) ..................... 12 57744

(51) Int. Cl.
| | |
|---|---|
| *G06Q 40/00* | (2012.01) |
| *G06Q 20/32* | (2012.01) |
| *G06Q 20/38* | (2012.01) |
| *G07F 7/08* | (2006.01) |

(52) U.S. Cl.
CPC .......... *G06Q 40/00* (2013.01); *G06Q 20/32* (2013.01); *G06Q 20/3276* (2013.01); *G06Q 20/3278* (2013.01); *G06Q 20/388* (2013.01); *G07F 7/0893* (2013.01)

(58) Field of Classification Search
CPC ........................................ G06Q 40/00
USPC ........................................ 713/180
See application file for complete search history.

(56) References Cited

U.S. PATENT DOCUMENTS

| | | |
|---|---|---|
| 7,458,510 B1 | 12/2008 | Zhou |
| 2006/0012473 A1 | 1/2006 | Bishop et al. |

FOREIGN PATENT DOCUMENTS

WO  01/73575 A1  10/2001

OTHER PUBLICATIONS

French Search Report dated Apr. 26, 2013 for corresponding French Patent Application No. 1257744, filed Aug. 9, 2012.

*Primary Examiner* — Jacob Lipman
(74) *Attorney, Agent, or Firm* — David D. Brush; Westman, Champlin & Koehler, P.A.

(57) ABSTRACT

A method and apparatus are provided for verifying authenticity of a data acquisition peripheral to be used, which has at least one identifier. The method includes: receiving the identifier by means of an authentication server, verifying, by the authentication server, an association of the identifier with a referenced authentic peripheral, delivering a decision of identification; and transmission, by the server, of the decision of identification.

11 Claims, 4 Drawing Sheets

METHOD FOR VERIFYING AUTHENTICITY, CORRESPONDING SERVER, SYSTEM AND COMPUTER PROGRAM

1. FIELD OF THE DISCLOSURE

The field of the disclosure is that of electronic payment terminals and more specifically portable or mobile payment terminals, and especially payment accessories such as detachable data acquisition peripherals (called DAPs or roam data readers), provided with means for reading an electronic card, such as a contact or contactless magnetic card, and especially an electronic payment card.

A simple connection of such a peripheral to a telephone provided with Internet communications functions, for example through the telephone audio connector, makes it possible indeed to then have a terminal capable of making payments. For example, the data read on a magnetic card can be transmitted by the peripheral in the form of DTMF codes to the telephone which can then transmit them to an online payment application.

2. TECHNOLOGICAL BACKGROUND

The facility with which DAPs can be installed enables them to be adapted to novel uses, especially in various environments, for example environments without communications infrastructures. Payments by DAPs can thus be done through a private individual's smartphone or a merchant working outdoors, for example an artisan working in private homes or moving about in fairs or markets.

These novel possibilities of use, especially by nomadic merchants who are not known to their customers, raise a new problem of trust for their customers.

In addition, the hardware functions of these terminals are relatively basic and can be implemented at low cost. Consequently, such terminals are easy to make.

This explains the success of such terminals as well as the development of fraudulent solutions, aimed for example at obtaining confidential banking data from customers or aimed at obtaining debits of undue amounts.

3. SUMMARY

One particular embodiment proposes a method for verifying the authenticity of a data acquisition peripheral to be used, said data acquisition peripheral to be used comprising at least one identifier.

According to an embodiment, such a method comprises:
a step of receiving said identifier by means of an authentication server,
a step of verifying, by said authentication server, an association of said identifier with a referenced authentic peripheral, delivering a decision of identification;
a step of transmission, by said server, of said decision of identification.

Thus, the solution of an embodiment enables a user who has to use a DAP, for the manipulation of sensitive data (for example banking data), to make sure of the inoffensive nature of this DAP before using it.

According to one particular characteristic of an embodiment, the method further comprises a step of obtaining, by said authentication server, at least one piece of complementary information coming from said data acquisition peripheral to be used, said piece of complementary information representing an absence of damage to and/or of break-in into said data acquisition peripheral to be used.

An embodiment of the present disclosure thus not only makes it possible to take account, during the server's response, of the authenticity of the peripheral but also, when the DAP is provided with physical securing means, to detect any possible damage or break-in in the peripheral, for example to fraudulently obtain data entered into or read by this peripheral.

According to one particular characteristic of an embodiment, the method comprises a step of checking the authenticity of said data acquisition peripheral to be used, delivering a decision of authentication of said data acquisition peripheral to be used.

An embodiment thus enables the user to detect a counterfeit DAP fraudulently reutilizing an identifier corresponding to an authentic DAP.

According to one particular characteristic of an embodiment, the method further comprises a step of acquisition, prior to said step of transmission, enabling the acquisition of at least said identifier.

Such an embodiment thus offers advantages in terms of simplicity of use and reliability, since it avoids manual keying in by the user. It also enables a faster and more discreet verification by the user. Indeed, this user may wish to verify the authenticity of the DAP presented to him while at the same time being embarrassed or uncomfortable with respect to a third party (a merchant for example) when making this verification. Certain embodiments, in which the verification is done automatically at the initiative of the user's terminal, can offer increased security to the user while at the same time enabling him to feel released of the onus of making this verification with respect to third parties.

According to one particular embodiment, said step of acquisition comprises a sub-step belonging to the group comprising:
a reading of a barcode and/or a flash code carried by said data acquisition peripheral to be used and comprising said identifier;
a reception of a data stream by wireless communications means, said data stream comprising said identifier;
a reading of an RFID label carried by said data acquisition peripheral to be used and comprising said identifier;
an optical recognition of characters carried by said data acquisition peripheral to be used and comprising said identifier.

According to one particular characteristic of an embodiment, said step of acquisition furthermore provides a piece of information to designate said authentication server.

Such an embodiment offers the advantage of making it possible to undertake a verification with a server that is suited to the DAP to be authenticated.

According to one particular characteristic of an embodiment, said step of verifying comprises a sub-step of obtaining a piece of information designating a communications terminal associated with said referenced authentic peripheral.

Thus, in certain embodiments, the solution offers the server a means of dialog with the referenced authentic DAP by means of the terminal designated by the designating information.

Furthermore, the definition of a reference merchant terminal for the referenced authentic DAP also offers additional means for verifying the authenticity of the DAP to be used. It also enables verification of the reliability of the third-party terminal to which the DAP is connected.

According to one particular characteristic of an embodiment, said step for transmitting said identification decision comprises, prior to said step of checking the authenticity of said data acquisition peripheral to be used, at least one sub-step belonging to the group comprising:

the transmission of at least one piece of data to be presented on said referenced authentic peripheral associated with said identifier;

the transmission of at least one piece of data to be presented on at least one communications terminal;

the launching of a test sequence from said referenced authentic peripheral associated with said identifier;

a combination of several of these sub-steps.

According to one particular embodiment, said identifier is transmitted from a communications terminal and said decision of identification is received by said communications terminal.

Thus, an embodiment enables the user to test a DAP via a user's terminal, independently of the merchant's terminal, in particular so as to protect himself against an unexpected operation by a fraudulent terminal. Such an embodiment also offers advantages in terms of discretion for the customer with respect to third parties.

According to another aspect, an embodiment pertains to a computer program product comprising program code instructions for the implementation of the above-mentioned method (in any one of its different embodiments), when said program is executed on a computer.

According to yet another aspect, an embodiment pertains to a server for authenticating a data acquisition peripheral to be used, said peripheral comprising at least one identifier.

According to an embodiment, such a server comprises:
means for receiving said identifier;
means for verifying an association of said identifier with a referenced authentic peripheral, delivering an decision of identification;
means for transmitting said decision of identification.

Advantageously, the authentication server comprises means for implementing steps which it performs in the method for verifying authenticity as described here above in any one of its different embodiments.

According to yet another aspect, an embodiment pertains to a system for verifying the authenticity of a data acquisition peripheral to be used, connected to a first communications terminal, said peripheral comprising at least one identifier, and said system comprising at least one second communications terminal and a server for authenticating a peripheral.

According to an embodiment, said system comprises:
means for transmitting said identifier from said second communications terminal to said server;
means for testing an acquisition of a particular sequence of data from the authenticated peripheral used by said first terminal;
means for receiving a decision of identification of said server by said second terminal.

The solution of an embodiment of the disclosure thus enables a verification of all the apparatuses involved in a bank transaction before it is performed.

Advantageously, the system for verifying authenticity according to an embodiment comprises means for implementing the steps that it performs in the method for verifying authenticity as described here above, in any one of its different embodiments.

4. LIST OF FIGURES

Other features and advantages shall appear from the following description, given by way of a non-exhaustive indication, and from the appended drawings of which.

In all the figures of the present document, the identical elements and steps are designated by a same numerical reference.

5. DETAILED DESCRIPTION 5.1 General Principle

Figure 1:
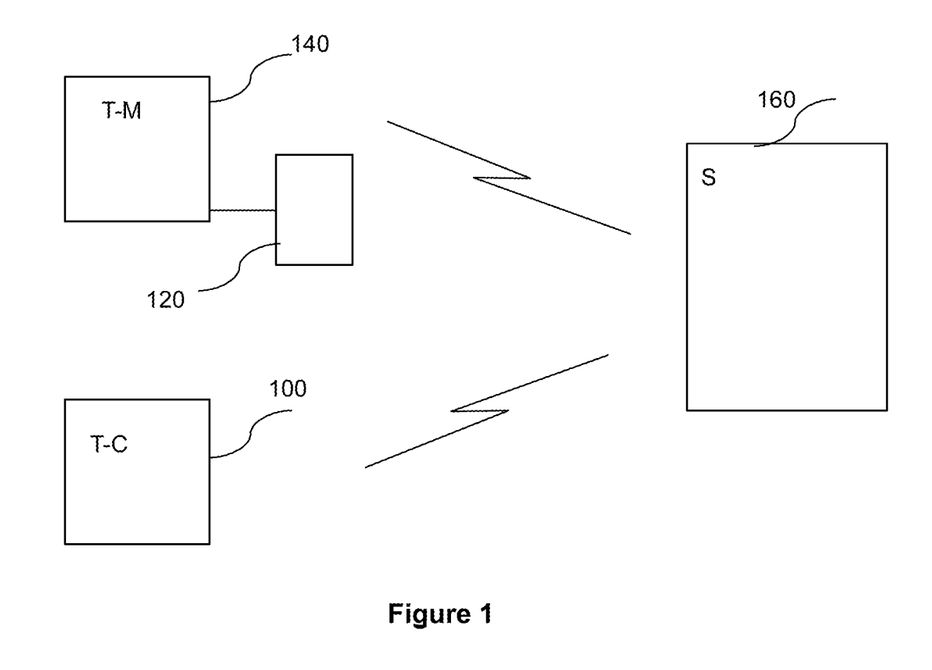
FIG. 1 presents the general principle of an embodiment.

Referring now to FIG. 1, the general principle of an embodiment of the disclosure is presented. This principle consists in enabling a user (or "customer") of a terminal 100 provided with Internet type communications functions, for example a smartphone, to be able to make sure of the authenticity of a DAP 120 before making payment by means of this DAP, for example before inserting his credit card into this DAP 120.

The solution of an embodiment proposes to the user that he makes a verification of authenticity of the DAP 120 with the authentication server 160 and receive in return information expressing the result of this verification and enabling him, in addition if necessary, to make sure that the DAP that he is going to use is truly the one whose authenticity has been verified.

In certain embodiments, as illustrated in FIG. 1, it can be a DAP that will be used from the terminal 140 of a third party. In other embodiments, it can be a DAP belonging to a third party which will be used from the user's own terminal, for example because the third party does not have any available terminal.

The verification of the authentication of the DAP can be initiated especially from the user's own terminal 100. Such an embodiment offers the user additional guarantees of security, since the verification is initiated from an apparatus about whose reliability he has no doubts whatsoever.

According to an embodiment, the method can be implemented manually by the user, in linking up to an application situated on a remote server accessible through an Internet connection for example, or automatically, by means of an application downloaded on the user's telephone that undertakes the task of dialoging with an application situated on a remote server.

The method can also be implemented through an application downloaded to the terminal of the third party.

5.2 Presentation of a First Embodiment of the Disclosure

Figure 2:
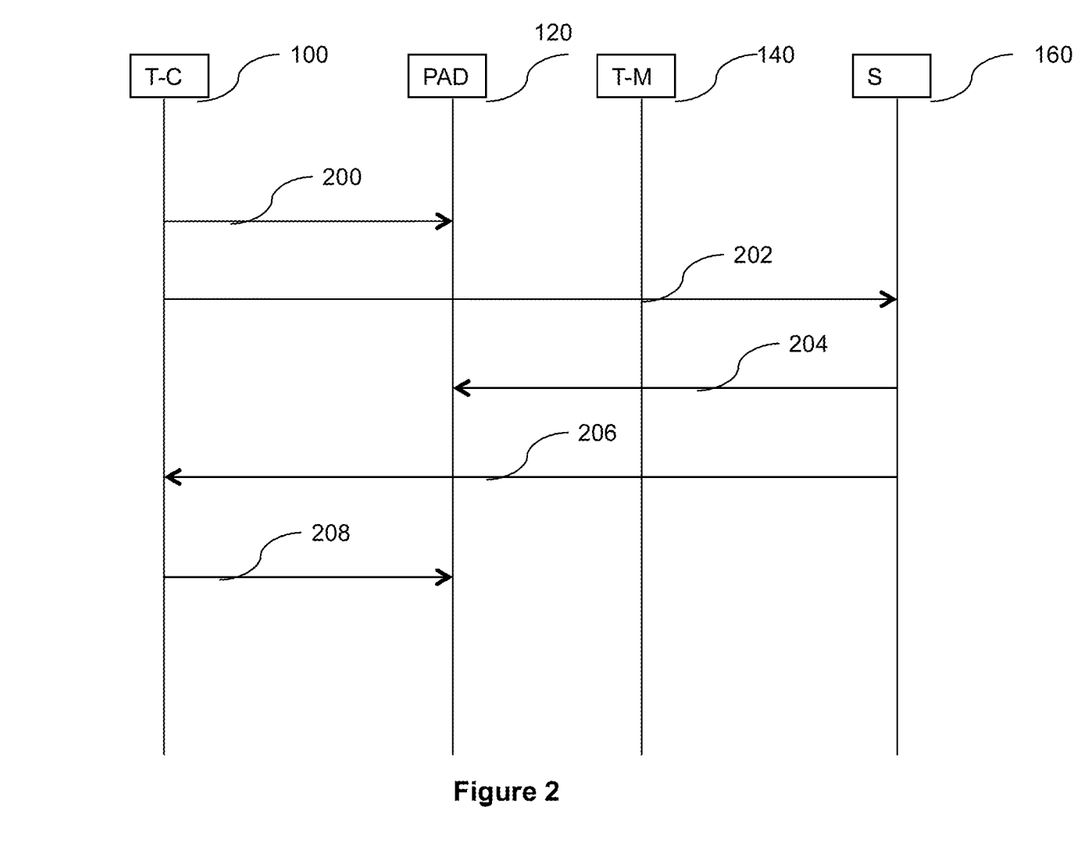
FIG. 2 presents the steps of the method according to a first particular embodiment.

Referring to FIGS. 1 and 2, we present the steps of the method according to a first particular embodiment.

In this embodiment, the method of authentication is initiated from the terminal 100 of a client (T-C) wishing to make payment from a DAP 120 belonging to a merchant.

In the embodiment presented, the user has his own telephone 100 to verify the authenticity of the merchant's DAP 120. This telephone 100, which is of a smartphone type, comprises means for communications with the DAP 120. This can for example be a USB port or Bluetooth type communications means or the audio connector of the telephone.

In the embodiment illustrated in FIG. 2, the method comprises first of all a step 200 of acquisition, enabling especially the acquisition of an identifier contained in the DAP 120.

This acquisition step 200 can be implemented by the terminal 100 at the initiative of the terminal itself (for example following a routine interrogation of the DAPs in proximity), or at the initiative of the user (to minimize the consumption of his terminal battery for example).

The acquisition step 200 can especially use communications means connecting the phone and the DAP 120 to acquire this identifier (for example an audio connector).

The terminal 100 can also be provided with an RFID reader enabling the reading of an RFID label present on a DAP and comprising the identifier of a DAP, the reader being activated as soon as the terminal 100 is in the neighborhood of a DAP.

The acquisition step 200 can thus implement image-acquisition means such as a scanner or a digital camera, activated by the user, for example by means of a specific application executed on his telephone and enabling the acquisition of a barcode or a 2D code (or flash code) present in the DAP 120 and comprising an identifier of the peripheral.

In other embodiments, the identifier is entered by hand by the customer at the terminal 100, for example by the entry of a serial number present on the DAP.

In certain embodiments, the acquisition step 200 can also make it possible to obtain a piece of information for addressing an authentication server to which the acquired identifier is submitted. This addressing information can be acquired at the same time as the identifier of the DAP. For example, it can be contained in the same flash code as the identifier. The acquisition of the information for addressing and acquisition of the identifier can also be done separately.

The method further comprises a step 202 of receiving the identifier by means of an authentication server 160. In certain embodiments, this may be a unique server, the address of which is pre-recorded on the user's telephone, for example during the downloading into the phone of an application dedicated to DAP authentication. The same server is then approached whatever the DAP present. In other embodiments, it can be an address obtained from the DAP 120 itself, as presented here above, which can differ depending on the DAPs to be verified. It can for example be an electronic address of the manufacturer of the DAP 120.

The method then comprises a step of verifying, by the server, of the association of the received identifier with a referenced authentic DAP. It can for example be the fact that the identifier belongs to a list of serial numbers and/or manufacturing batch numbers maintained by a DAP manufacturer and accessible from a database.

The step of verifying can comprise especially a step 204 for two-way dialog with the DAP to be used, implemented by means of the customer's telephone 100 as presented in FIG. 2, or by means of the third-party's telephone 140. This dialog can be based for example on an exchange of unique and/or dynamic keys or digital certificates with the DAP in order to enable its authentication.

In certain particular embodiments, for example when the DAP to be authenticated comprises means of physical securing (for example means for detection of break-in and/or erasure of secrets), this step can also include a verification of the absence of damage or break-in in the DAP 120.

Finally, to protect the user's telephone against risks of computer viruses, and avoid having to download a specific application, this dialog can be done, in certain embodiments, solely through the browser of the user's telephone 100. Such an embodiment furthermore offers the advantage of requiring no action on the part of the user since the verification can be done automatically between the server and the terminal 100 to which the DAP is connected.

The step of verifying can also include a step of obtaining a piece of information designating a terminal associated with the referenced authentic DAP. This designating information thus makes it possible to attach a DAP to the terminal to which it is usually connected (this terminal is called a "referenced merchant terminal" here below for the sake of simplification). Such a piece of designating information can, for example, be stored in a centralized way in a database also referencing the authentic DAPs.

Such an embodiment enables the server to dialog with the referenced authentic DAP by means of the referenced merchant terminal. It can also enable the server to have a "sure" merchant terminal for the transmission of data to be presented (see step 206 especially).

The step of verifying reaches a decision for identifying the DAP 120 to be used, expressing its reliability.

The method then comprises a step 206 of transmission of this decision, by the server, for example towards the user's telephone 100, towards the third-party terminal 140 and/or towards the referenced merchant terminal.

The step of transmission of said decision of the server can especially include at least one sub-step of transmitting a piece of data to be presented to the customer's communications terminal, the referenced merchant's terminal and/or the user's terminal, for example a visual, sound and/or text indication. This indication can depend especially on the decision of identification.

Thus, the step 206 can for example include the generation of a voice or text message on the telephone 100, informing the customer of a potential risk and/or, on the contrary, informing him that the authenticated DAP can be considered to be reliable.

In certain embodiments, especially in the embodiment illustrated in FIG. 2, the method can include a step 208 of checking the authenticity of the DAP to be used.

This step can especially be preceded, during the transmission step, by a step of supplying, by the server, means enabling the user to make sure that the authentic DAP associated with the identifier included in the DAP to be used is truly the one presented by the merchant.

This step of supplying means can comprise especially the transmission of data to be presented on the DAP, on the client's terminal 100, on the third-party's terminal 140 and/or on the referenced merchant terminal.

For example, it can include a sub-step of transmission, by the server, of data commanding the illumination of the LEDs presented on the DAP. The color (red or green for example) and/or the pace of animation of these LEDs will indicate the decision of identification of the DAP (and possibly the detection of a risk of break-in into the DAP) and will in addition therefore enable the user to visually check that the DAP used is truly the referenced authentic DAP.

In other embodiments, which are possibly complementary ones, also suited to DAPs integrating at least one LED, the checking step 208 can be implemented by a particular LED flashing sequence, defined dynamically by the server (for example a random sequence) and presented in advance to the user of the telephone 100 during the step 206, for example by means of a sub-step of transmitting an SMS.

In other embodiments, the step 206 of transmitting the decision from the authentication server may include a sub-step of transmitting a code to be presented on the client's telephone 100 and a sub-step of transmitting this same code to the merchant terminal referenced and the checking step can comprise the reading and comparison of these two codes. The checking step therefore enables the user to make sure that the third-party terminal is truly the referenced merchant terminal.

The code to be compared can, for example, have been generated by the authenticated DAP, when it was being referenced for example, or dynamically, or by an application executed on the referenced merchant terminal.

In yet other embodiments, which may also be complementary embodiments, it is possible to provide complementary and easy-to-check information on the referenced authentic DAP during the step 206. This information can be for example be information on the merchant recorded for the referenced authentic DAP (for example his name, activity, photograph) or again a locating of the referenced authentic DAP or of the referenced merchant terminal when they are provided with means enabling them to be located by the server. In the latter case, the checking step 208 can especially be performed automatically by the dedicated application being executed on the telephone 100, by comparison of a location of the referenced authentic DAP or of the referenced merchant terminal with a location of the telephone 100 for example.

5.3 Presentation of a Second Particular Embodiment of the Disclosure

Figure 3:
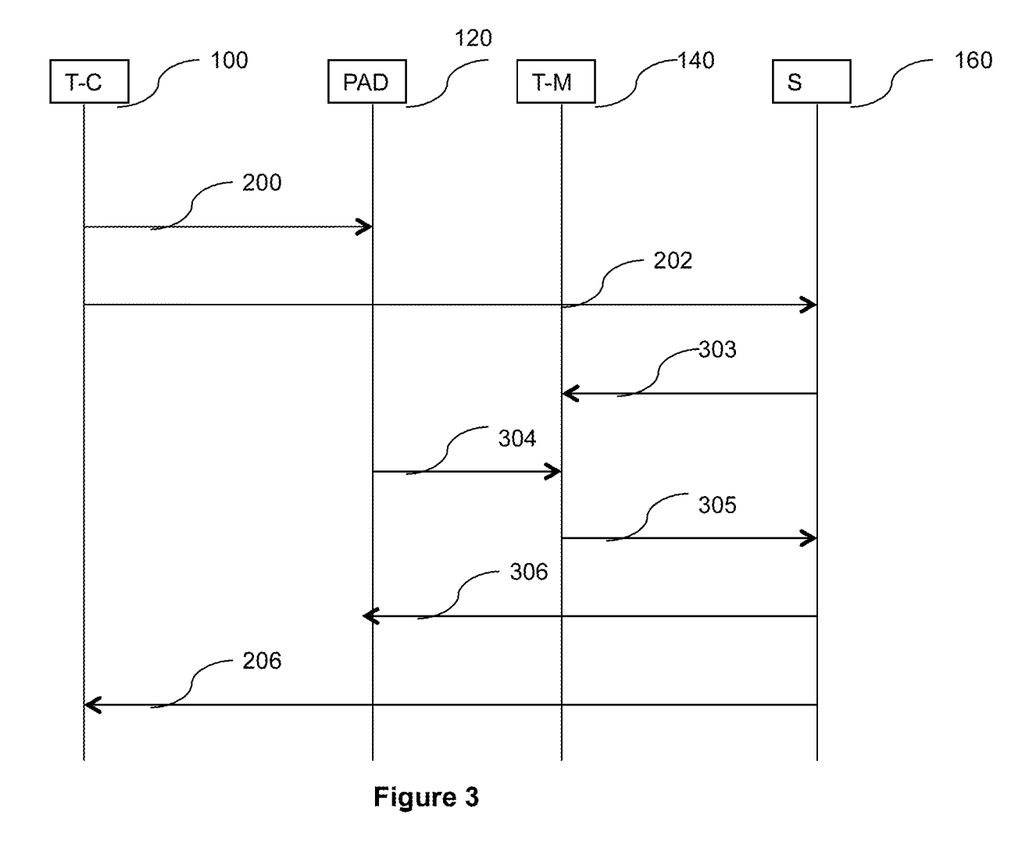
FIG. 3 presents the steps of the method according to a second particular embodiment.

Referring now to FIG. 3, we present a second embodiment of the disclosure.

This embodiment differs especially from the embodiment illustrated in FIG. 2 in that the step of verifying the association of the identifier of the DAP to be used with an authentic DAP comprises a step 303 of launching a fictitious transaction to be performed, using the DAP to be used to enable a verification of the integrity of the complete processing chain.

This launching step 303 can be done from the authentication server to the client's terminal 100 or, as illustrated in FIG. 3, to the third-party terminal 140.

In the latter case, the reception step 202 could especially comprise a sub-step of reception, by the authentication server, of the identifier of the third party's telephone 140 towards which the launching order is addressed.

In another embodiment, the launching step 303 can be done towards the referenced merchant terminal. The absence of launching will thus easily enable a user to realize that the DAP to be used is not an authentic DAP.

The fictitious transaction to be performed can, for example, include the reading by the DAP to be used of a test card provided to the merchant when purchasing the DAP or provided to the user, for example when a subscription is taken out to an application dedicated to verifying the authenticity of the DAP or as part of a subscription to secured online banking services.

Thus, in the embodiment illustrated in FIG. 3, the pieces of data read by the DAP from a simple magnetic card, used as a test card, are furnished during the step 304 to the third party's telephone 140 and then received by the server (step 305).

The DAP can, in particular, remain blocked, thus preventing any other transaction, from the launching of the test up to the reception of a command for unblocking the server (step 306).

The method described here above is intended for DAPs used for the reading of electronic payment cards. It is clear however that it can easily be adapted to numerous other applications without departing from the framework of the disclosure, whenever the reliability of the DAP is of critical importance, for example for electronic cards establishing an individual's identity.

It is also clear that many other embodiments of the disclosure can be envisaged.

5.4 Structure of an Authentication Server According to the Disclosure

Figure 4:
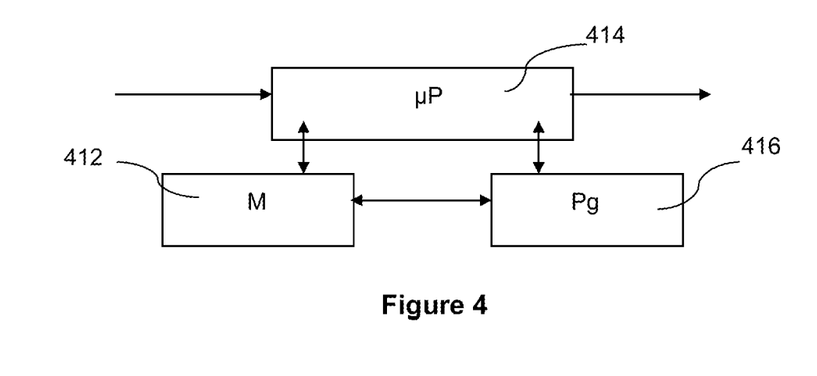
FIG. 4 presents the structure of an application server according to one particular embodiment.

Referring to FIG. 4, we present the simplified structure of an authentication server according to an embodiment of the disclosure.

Such a server comprises a memory 412 comprising a buffer memory, a processing unit 414 equipped for example with a microprocessor μP, and driven by a computer program 416, the execution of which implements a method for verifying authenticity according to one of the particular embodiments.

At initialization, the code instructions of the computer program 416 are for example loaded into a RAM and then executed by the processor of the processing unit 414.

The processing unit 414 inputs a header of a data stream. The microprocessor of the processing unit 414 implements the steps of the method for verifying authenticity described here above according to the instructions of the computer program 416.

To this end, the authentication server comprises, in addition to the buffer memory 412:
 means for receiving an identifier included in a data acquisition peripheral to be used,
 means for verifying an association of said identifier with a referenced authentic peripheral delivering a decision of identification;
 means for transmitting said decision of identification.

These means are driven by the microprocessor of the processing unit 412.

A particular embodiment of the disclosure is implemented by means of software and/or hardware components. From this point of view, the term "means" in this document can correspond equally well to a software component and to a hardware component or to a set of hardware and software components.

A software component corresponds to one or more computer programs, one or more sub-programs of a program or more generally to any element of a program or item of software capable of implementing a function or a set of functions according to what is described here for the means concerned. Such a software component is executed by a data processor of a physical entity (terminal, server, gateway, set-top box, router, etc) and is capable of accessing the hardware resources of this physical entity (memories, recording media, communications buses, input/output electronic cards, user, etc).

In the same way, the hardware component corresponds to any element of a set of hardware capable of implementing a function or a set of functions according to what is described here for the module concerned. This can be a programmable hardware component or a component with an integrated processor for the execution of software, for example an integrated circuit, a smartcard, a memory card, an electronic card for executing firmware, etc.

At least one embodiment of the disclosure provides a technique that can be used to reassure the user of a DAP wishing to make payment from this DAP.

At least one embodiment provides a technique of this kind that is easy to implement for a user, without requiring any particular technical competence.

At least one embodiment provides a technique of this kind that can be used through a standard communications terminal available in the market.

Although the present disclosure has been described with reference to one or more examples, workers skilled in the art will recognize that changes may be made in form and detail without departing from the scope of the disclosure and/or the appended claims.

The invention claimed is:

1. A method of verifying authenticity of a data acquisition peripheral to be used, said data acquisition peripheral to be used comprising at least one identifier, said method comprising the following acts:
   receiving said identifier by an authentication server;
   verifying, by said authentication server, an association of said identifier with a referenced authentic peripheral, delivering a decision of identification;
   transmission, by said authentication server, of said decision of identification, said transmission further comprising supplying, by said authentication server, an element enabling a user to check that said data acquisition peripheral to be used is truly said referenced authentic peripheral; and
   obtaining, by said authentication server, at least one piece of complementary information coming from said data acquisition peripheral to be used, said piece of complementary information representing an absence of damage to and/or break-in into said data acquisition peripheral to be used.

2. The method of verifying according to claim 1, wherein said verifying comprises obtaining a piece of information designating a communications terminal associated with said referenced authentic peripheral.

3. The method for verifying according to claim 1, wherein said identifier is transmitted from a communications terminal and said decision of identification is received by said communications terminal.

4. The method of verifying according to claim 1, wherein the method comprises a step of checking the authenticity of said data acquisition peripheral to be used, using said element, delivering a decision of authentication of said data acquisition peripheral to be used.

5. The method of verifying according to claim 4, wherein said act of supplying comprises, prior to said checking the authenticity of said data acquisition peripheral to be used, at least one sub-act of the group consisting of:
   transmission of at least one piece of data to be presented on said referenced authentic peripheral associated with said identifier;
   transmission of at least one piece of data to be presented on at least one communications terminal;
   transmission of a launching order to launch a test sequence from said referenced authentic peripheral associated with said identifier; or
   a combination of at least two of these sub acts.

6. The method of verifying according to claim 1, wherein the method further comprises acquiring at least said identifier from the data acquisition peripheral.

7. The method of verifying according to claim 6, wherein said acquiring comprises at least one of the group consisting of:
   a reading of a barcode and/or a flash code carried by said data acquisition peripheral to be used and comprising said identifier;
   a reception of a data stream by wireless communications means, said data stream comprising said identifier;
   a reading of an RFID label carried by said data acquisition peripheral to be used and comprising said identifier; or
   an optical recognition of characters carried by said data acquisition peripheral to be used and comprising said identifier.

8. The method of verifying according to claim 6, wherein said acquiring furthermore acquires a piece of information to designate said authentication server.

9. A non-transitory computer-readable memory comprising a computer program product stored thereon and comprising program code instructions for implementation of a method of verifying authenticity of a data acquisition peripheral to be used, when said program is executed on a processor, wherein said data acquisition peripheral to be used comprises at least one identifier and the method comprises the following acts:
   receiving said identifier by an authentication server;
   verifying, by said authentication server, an association of said identifier with a referenced authentic peripheral, delivering a decision of identification;
   transmitting, by said authentication server, said decision of identification, said act of transmitting further comprising supplying, by said authentication server, an element enabling a user to check that said data acquisition peripheral to be used is truly said referenced authentic peripheral; and
   obtaining, by said authentication server, at least one piece of complementary information coming from said data acquisition peripheral to be used, said piece of complementary information representing an absence of damage to and/or break-in into said data acquisition peripheral to be used.

10. A server for authenticating a data acquisition peripheral to be used, said peripheral including at least one identifier, said server comprising:
   means for receiving said identifier;
   means, comprising at least one hardware component, for verifying an association of said identifier with a referenced authentic peripheral, delivering an decision of identification;
   means for transmitting said decision of identification;
   means for supplying, by said authentication server, an element enabling a user to check that said data acquisition peripheral to be used is truly said referenced authentic peripheral; and
   means for obtaining at least one piece of complementary information coming from said data acquisition peripheral to be used, said piece of complementary information representing an absence of deterioration and/or absence of break-in into said data acquisition peripheral to be used.

11. A system for verifying authenticity of a data acquisition peripheral to be used, connected to a first communications terminal, said peripheral comprising at least one identifier, and said system comprising:
   at least one second communications terminal;
   a server configured to authenticate the data acquisition peripheral;
   means for transmitting said identifier from said second communications terminal to said server;
   means for verifying, by said server and comprising at least one hardware component, an association of said identifier with a referenced authentic peripheral, delivering an decision of identification;

means for transmitting said decision of identification from said server to said second terminal;

means for supplying, by said authentication server, an element enabling a user to check that said data acquisition peripheral to be used is truly said referenced authentic peripheral;

means for testing an acquisition of a particular sequence of data from the authenticated peripheral used by said first terminal; and means for obtaining, by said authentication server, at least one piece of complementary information coming from said data acquisition peripheral to be used, said piece of complementary information representing an absence of damage to and/or absence of break-in into said data acquisition peripheral to be used.

\* \* \* \* \*